US006922346B2

United States Patent
Wofford et al.

(10) Patent No.: US 6,922,346 B2
(45) Date of Patent: Jul. 26, 2005

(54) SYSTEM AND METHOD TO LIMIT MAXIMUM DUTY CYCLE AND/OR PROVIDE A MAXIMUM VOLT-SECOND CLAMP

(75) Inventors: Larry J. Wofford, Cary, NC (US); Michael T. Madigan, Cary, NC (US); Thomas N. Mathes, Cary, NC (US)

(73) Assignee: Texas Instruments Incorporated, Dallas, TX (US)

( * ) Notice: Subject to any disclaimer, the term of this patent is extended or adjusted under 35 U.S.C. 154(b) by 179 days.

(21) Appl. No.: 10/625,265

(22) Filed: Jul. 23, 2003

(65) Prior Publication Data

US 2005/0018453 A1 Jan. 27, 2005

(51) Int. Cl.[7] .............................................. H02M 1/12
(52) U.S. Cl. ...................................................... 363/41
(58) Field of Search ............................ 363/39, 41, 43, 363/56.01; 323/266, 268, 270, 273, 279, 281; 327/23, 26, 27, 172, 175

(56) References Cited

U.S. PATENT DOCUMENTS

| | | | |
|---|---|---|---|
| 5,021,937 A | | 6/1991 | Cohen |
| 5,710,697 A | * | 1/1998 | Cooke et al. ............ 363/21.11 |
| 6,229,366 B1 | * | 5/2001 | Balakirshnan et al. ...... 327/172 |
| 6,246,296 B1 | * | 6/2001 | Smith ........................ 332/109 |
| 6,356,464 B1 | * | 3/2002 | Balakrishnan et al. ... 363/21.01 |

OTHER PUBLICATIONS

Product brochure entitled, "Unitrode Average Current Mode PWM Controller", Texas Instruments Incorporated, pp. 1–9, Copyright 1999.
Product brochure entitled, "Unitrode Current Mode PWM Controller", Texas Instruments Incorporated, pp. 1–8, Copyright 1999.
Product catalog entitled, "Texas Instruments Sine On Power Supply Control", Texas Instruments Incorporated, www.ti.com/sc/aajq1, Issue 1, pp. 1–12, 1Q 2002.

* cited by examiner

*Primary Examiner*—Matthew V. Nguyen
(74) *Attorney, Agent, or Firm*—W. Daniel Swayze, Jr.; W. James Brady; Frederick J. Telecky, Jr.

(57) ABSTRACT

A system and method are disclosed to limit a maximum duty cycle and/or provide a volt-second clamp for a pulse-width modulated (PWM) signal. Depending on the circuit topology, this approach can limit the absolute duty cycle or operate as a volt-second clamp in which the duty cycle is limited as a function of a variable input control voltage, such as a line voltage. The duty cycle can be selectively programmed by setting one or more external reference components, such as one or more respective resistors. Additionally, through component matching, desired clamping can be achieved with a high level of accuracy.

27 Claims, 6 Drawing Sheets

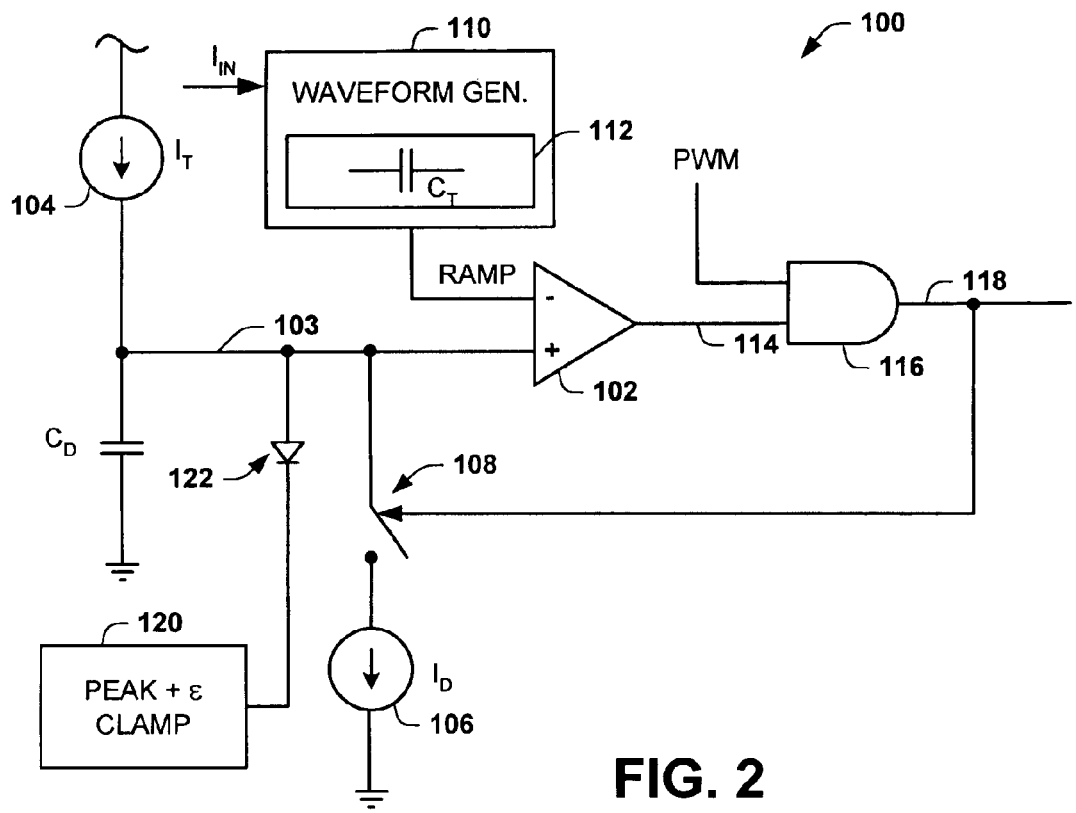
FIG. 2
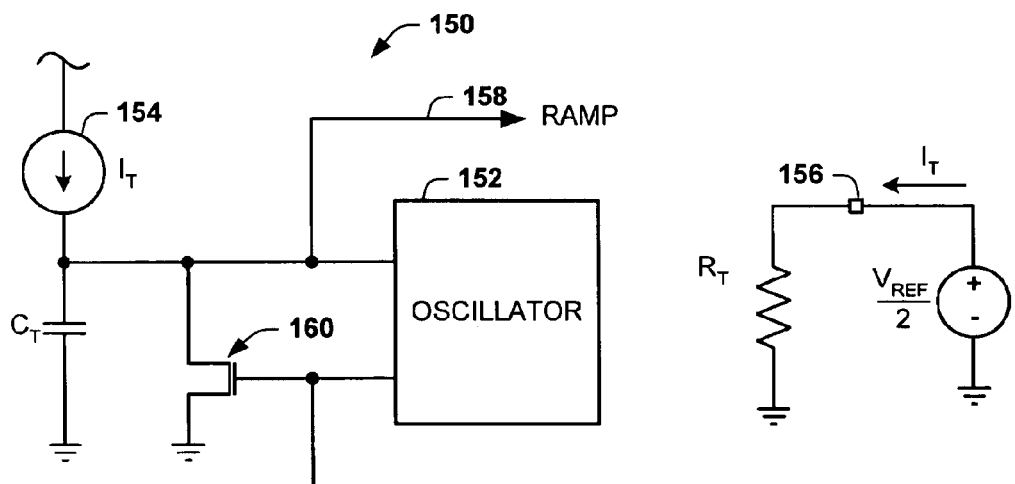
FIG. 3
FIG. 4

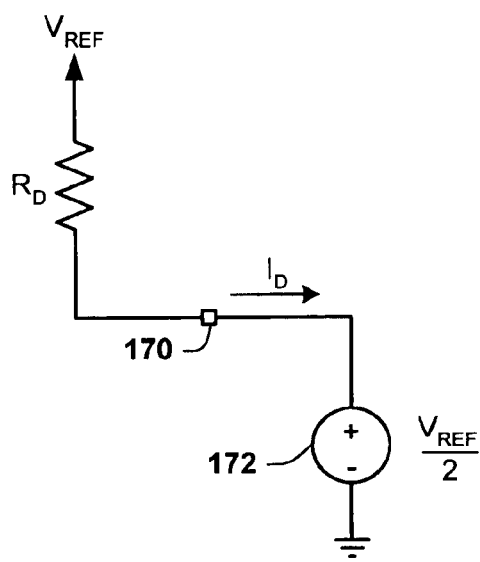
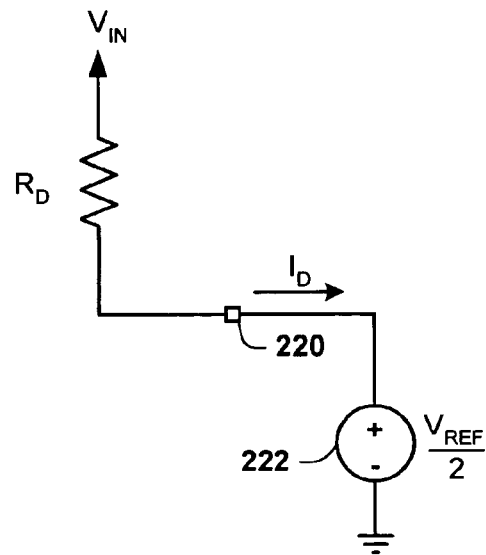
FIG. 5
FIG. 7
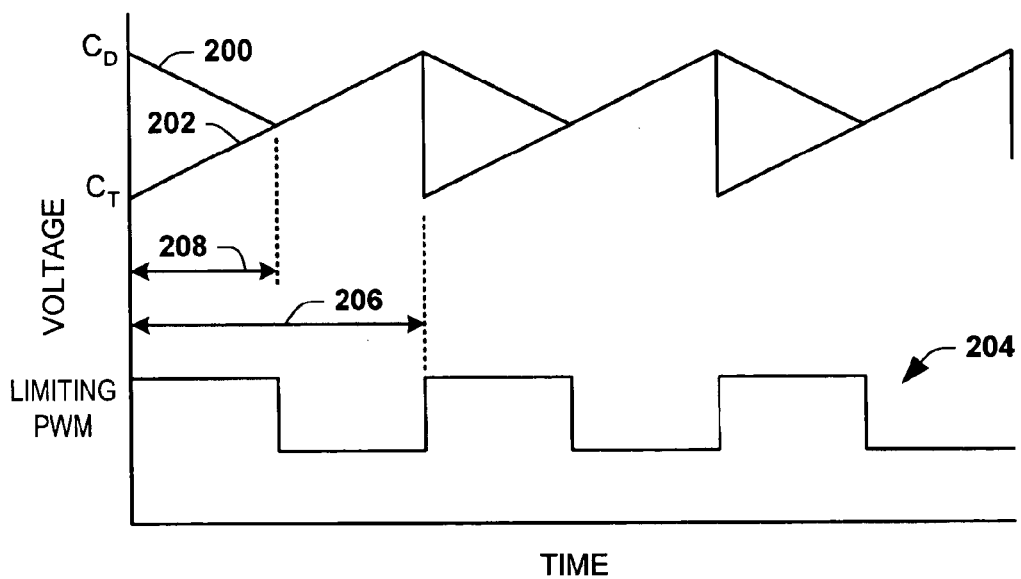
FIG. 6

SYSTEM AND METHOD TO LIMIT MAXIMUM DUTY CYCLE AND/OR PROVIDE A MAXIMUM VOLT-SECOND CLAMP

TECHNICAL FIELD

The present invention relates to electrical circuits and, more particularly, to limiting a maximum duty cycle or volt-second clamping.

BACKGROUND OF INVENTION

Various circuit topologies have been developed to control the flow of power and/or achieve efficient energy utilization in associated equipment. These technologies can generally be categorized as power electronics. The importance of power electronics in electrical equipment stems from its broad range of applications, including residential, industrial, commercial and communications devices to name a few.

Power electronics generally utilize one or more power converters to, for example, control and shape an input electrical signal into another electrical signal having different electrical characteristics, such as magnitude, frequency and/or the number of phases. With the continued advances in fabrication technologies, an increasing number of applications are making use of power converters, including power supplies as well as other power electronic converters or conditioners.

In some power converter applications, it is necessary to limit the maximum duty cycle of a signal generated by an associated pulse width modulator. For example, the pulse width modulator output signal is limited to a certain maximum duty cycle to avoid damage or failure of the power converter under various conditions, including transient and steady state conditions. The duty cycle controls the "on time" of the power converter. The possibility for damage of the power converter is due at least in part to the transformer's inability to demagnetize at large duty cycle ratios. That is, if the duty cycle becomes too large, the magnetic core can saturate and thereby cause permanent damage to the power converter circuitry. Similar concerns exist for other inductive applications. Accordingly, it becomes increasingly important to set a maximum duty cycle accurately. Thus, it becomes significant to limit the current in the inductor to avoid saturation. The flux in the inductor windings is proportion to the applied DC voltage and time, which electrical characteristics can be limited by a corresponding volt-second clamp.

Various approaches exist to limit a maximum duty cycle, typically including circuitry operative to clamp the output signal of the pulse width modulator. Operation of clamping circuitry can vary according to several factors, including, for example, accuracy and temperature stability of the clamp circuitry and associated reference voltages. The cumulative effect of such variations can amount to a sizeable tolerance in the maximum duty cycle setting.

One conventional approach for limiting maximum duty cycle is to average and compare the output signal of a pulse width modulation to a reference value. The reference value is proportional to the peak value of the comparator's output voltage. A closed loop circuit continually adjusts the duty cycle so the difference between the reference value and the average comparator output is substantially mitigated, which provides a maximum duty cycle output. Other approaches exist, but generally are unable to achieve a desired level of accuracy for either a maximum duty cycle clamp or volt-second clamp.

SUMMARY OF INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to a system and method for limiting maximum duty cycle and/or providing a volt-second clamp for a pulse-width modulated (PWM) signal. The system includes circuitry that provides a clamp waveform based at least in part on a first reference signal. The clamp waveform is compared relative to a reference waveform to provide a limiting signal. The reference waveform can be generated based at least in part on a second reference signal. In this way, the limiting signal has a duty cycle functionally related to the first and second reference signals, whereby the duty cycle of a PWM signal can be limited by applying (e.g., ANDing) the limiting signal to the PWM signal.

According to an aspect of the present invention, one or more reference signals can be programmed by utilizing one or more respective external components. By generating the reference waveform and the clamp waveform based on the reference signals, the maximum duty cycle can be set as a function of the external component(s). Additional accuracy can be achieved by matching components (e.g., a capacitors) that are employed to generate the respective clamp and reference waveforms.

According to another aspect of the present invention, a given reference signal can be fixed or variable as a function of an input control voltage. Where the given reference signal changes, a volt-second clamp is achieved by the clamp system adjusting the duty cycle of the limiting signal by an amount functionally related (e.g., inversely proportional) to the change in the reference signal.

The following description and the annexed drawings set forth certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

BRIEF DESCRIPTION OF THE DRAWINGS

FIG. 2 depicts an example of a clamp system in accordance with an aspect of the present invention.

FIG. 3 depicts an example of a waveform generator that can be utilized in conjunction with a clamp system in accordance with an aspect of the present invention.

FIG. 4 illustrates an approach that can be utilized to generate a reference current for use with a clamp system in accordance with an aspect of the present invention.

FIG. 5 illustrates an approach that can be utilized to generate another reference current for use with a clamp system in accordance with an aspect of the present invention.

FIG. 6 illustrates a graph of several signals versus time in a clamp system operating in accordance with an aspect of the present invention.

FIG. 7 illustrates another approach that can be utilized to generate a reference current for use with a clamp system in accordance with an aspect of the present invention.

DETAILED DESCRIPTION OF THE INVENTION

The present invention relates to a system and method to limit a maximum duty cycle and/or provide a volt-second clamp for a pulse-width modulated (PWM) signal. Depending on the circuit topology, this approach can limit the absolute duty cycle or operate as a volt-second clamp in which the duty cycle is limited as a function of a variable input control voltage, such as a line voltage. The duty cycle can be selectively programmed by setting one or more external reference components, such as one or more respective resistors. Additionally, through component matching, desired clamping can be achieved with a high level of accuracy.

Figure 1:
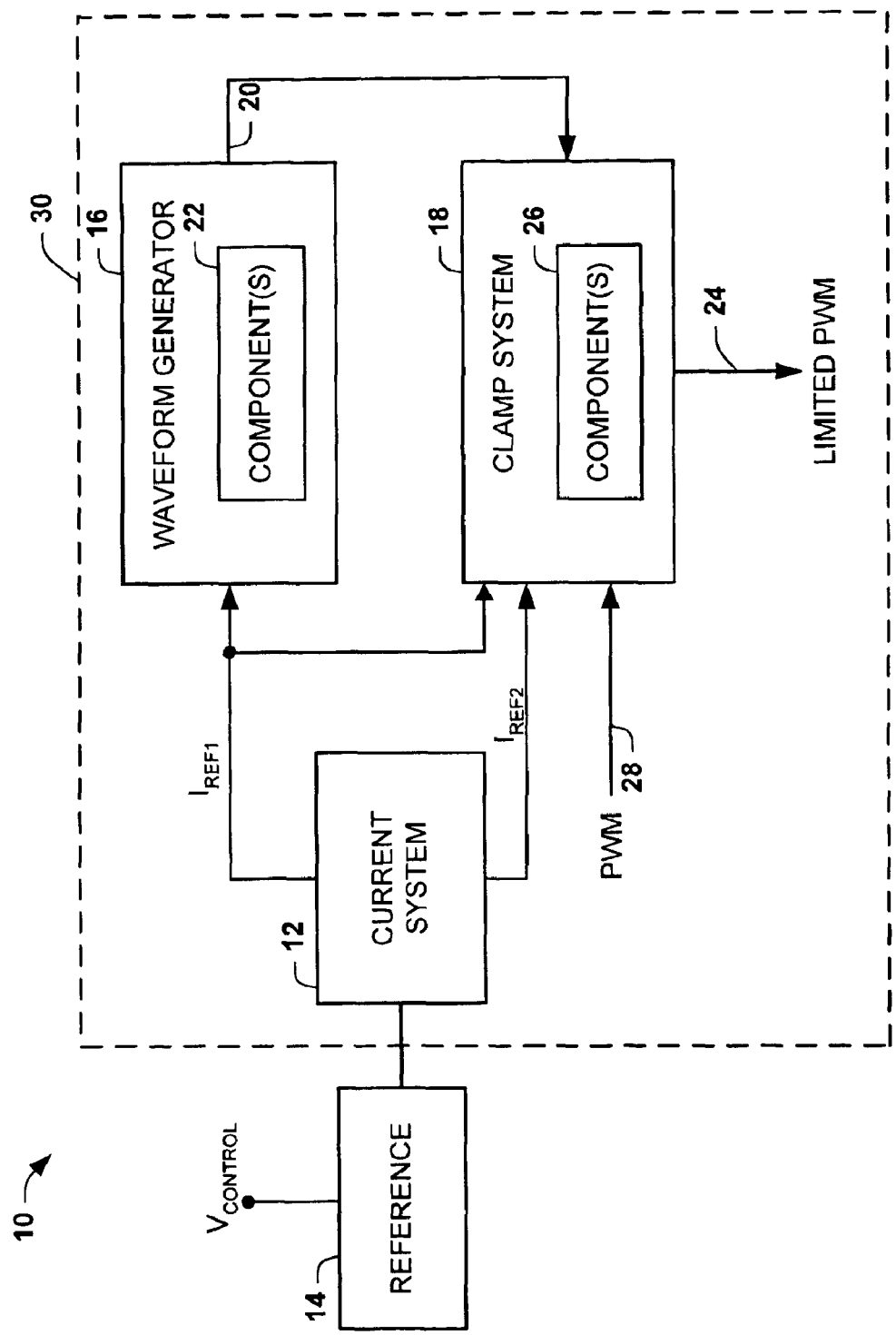
FIG. 1 illustrates a schematic block diagram of a clamp system in accordance with an aspect of the present invention.

FIG. 1 is a block diagram illustrating a system 10 that can operate as either a maximum duty cycle clamp or a volt-second clamp in accordance with an aspect of the present invention. The system 10 includes a current system 12 that generates one or more reference signals that can be mirrored throughout the system 10 as well as through associated circuitry. In this example, the current system 12 generates two reference currents $I_{REF1}$ and $I_{REF2}$. The reference currents $I_{REF1}$ and $I_{REF2}$ are generated based on one or more reference components, schematically indicated at 14, which is coupled to a control voltage $V_{CONTROL}$. The control voltage $V_{CONTROL}$ can be a fixed reference voltage (e.g., a predetermined voltage level or electrical ground) or a variable voltage that can fluctuate over time, such as an input line voltage. Thus, the current system 12 generates the reference currents $I_{REF1}$ and $I_{REF2}$ as a function of the reference component(s) 14. For example the reference component(s) 14 can be implemented as one or more resistors coupled to the system 10 in order to set the reference currents $I_{REF1}$ and $I_{REF2}$, which can define a desired maximum duty cycle or set a corresponding maximum volt-second clamping value.

The current system 12 provides the current $I_{REF1}$ to a waveform generator 16 and to a clamp system 18, such as through corresponding current mirrors.

The waveform generator 16 is operative to generate a waveform, such as a ramp waveform indicated at 20, which is provided to the clamp system 18. The waveform generator 16 includes one or more circuit components generally indicated at 22. The one or more circuit components 22, for example, can be one or more capacitors that can be charged as a function of the reference current $I_{REF1}$ for use in generating the waveform at 20. For example, $I_{REF1}$ can be applied to the capacitor(s) to respectively charge and discharge the capacitor(s) as a function of a clock signal and generate a corresponding ramp signal. The waveform generator can include an oscillator or other circuitry that can generate the clock signal as a function of the voltage across the capacitor relative to a predetermined peak voltage. Alternatively, the waveform generator 16 could be synchronized to provide the ramp signal at a frequency provided by another synchronization signal (not shown).

The clamp system 18 is operative to provide a PWM signal at 24, which has a duty cycle not greater than a maximum value. As mentioned above, the maximum duty cycle for the signal 24 can be programmed based on the reference component 14.

By way of example, the clamp system 18 includes one or more components, generally indicated at 26, that enable the clamp system to generate the PWM signal at 24 having a maximum duty cycle as provided by the clamp system. The clamp system 18 controls the duty cycle of the PWM signal at 24 as a function of the reference signals $I_{REF1}$ and $I_{REF2}$. For example, one or more components 26 generate a corresponding clamp waveform as a function of the reference signals. The clamp system 18 compares the clamp waveform relative to the reference waveform to generate a limiting signal, which can be a PWM signal. The limiting signal has a programmable characteristic (e.g., a duty cycle based on the reference component 14), such that it can be applied to limit a PWM signal 28. For example, the limiting signal has a duty cycle that can be programmed in a range from about 30% to about 80%, although other duty cycles also could be programmed according to an aspect of the present invention. The clamp system 18 generates the PWM signal at 24 as the function of the limiting signal and the PWM signal 28, such that it has a maximum duty cycle limited according to the limiting signal. The PWM signal at 28 can be provided by an associated PWM controller or other circuitry (not shown), as is known in the art.

The one or more components 26 of the clamp system 18 can be matched to the one or more components 22 of the waveform generator 16 to improve the accuracy of the system 10 in accordance with an aspect of the present invention. For example, the components 22 and 26 can be matched capacitors, meaning the respective capacitors are proportional to each other. Those skilled in the art will understand and appreciate that by implementing the waveform generator 16 and clamp system 18 in a common integrated circuit (IC) 30, the respective capacitors in the waveform generator and clamp system can be matched to a high degree of accuracy. This enables improved accuracy in the clamping function performed by the system 10 in accordance with an aspect of the present invention.

FIG. 2 is a schematic circuit diagram for a clamp system 100 that can be implemented in accordance with an aspect of the present invention. The clamp system 100 includes a capacitor $C_D$ that is coupled to a non-inverting input of a comparator 102 corresponding to a node 103. A current source 104 provides the current $I_T$ to the capacitor $C_D$. The current $I_T$ can be generated as a function of an external reference component, such as a resistor that is coupled to the associated IC implementing the system 100. For example, a reference current can be mirrored through a current network to provide the current $I_T$ to the clamp system 100 based on the external reference component.

Another current source 106 is coupled to the non-inverting input of the comparator 102 through an associated switch 108. The current source 106 is operative to provide another current $I_D$, which can be coupled through the switch 108 to sink current $I_D$ relative to the capacitor $C_D$. The current $I_D$ can be generated as a function of another reference component, such as an externally coupled resistor. A reference current generated based on the externally coupled resistor can be mirrored through an appropriate current network to provide the current $I_D$.

A waveform generator 110 provides a waveform, such as a RAMP signal, to an inverting input of the comparator 102. The RAMP signal can be generated as a function of one more components 112, including a capacitor $C_T$ associated with the generator. The capacitors $C_D$ and $C_T$ can be matched capacitors (e.g., having proportional capacitances) implemented in the same IC chip according to an aspect of the present invention. For example, the waveform generator 110 generates the RAMP signal by repeatedly charging and discharging the capacitor $C_T$ with an input current $I_{IN}$, which can be the same or different from $I_T$, at a desired frequency. The current $I_{IN}$ can be mirrored through a current network based on the same reference current used to provide the current $I_T$. According to one aspect of the present invention, the currents $I_{IN}$ and $I_T$ can be proportional (e.g., equal) so that matched capacitors $C_D$ and $C_T$ can charge in proportionally the same amounts.

The capacitor $C_D$ is charged as a function of the current $I_T$ when the switch 108 is open and, assuming that $I_T < I_D$, $C_D$ discharges as a function of the sum of currents $I_T$–$I_D$ when the switch is closed. The voltage across the capacitor $C_D$ defines a clamp waveform at the node 103. The comparator 102 provides a limiting signal at 114 to an input of an AND gate 116. The AND gate 116 performs an AND function on the limiting signal at 114 and a PWM signal to provide a PWM output signal at 118. The PWM signal at 118 has a maximum duty cycle that is limited according to the duty cycle of the limiting signal at 114. In particular, the duty cycle of the PWM signal at 118 is limited if the limiting signal at 114 has a lower duty cycle than the signal at 118, and the PWM signal at 118 is provided the duty cycle of the input PWM signal otherwise. The PWM signal, for example, is a PWM control signal generated by an associated PWM controller, such as may control the "on-time" of a power converter or other power electronic device employing the clamp system 100.

The limited PWM signal is fed back from 118 to control the state of the switch 108, and thereby controls the charging and discharging of the capacitor $C_D$. For example, the switch 108 closes when the comparator output signal at 114 and the PWM signal are HIGH, and the switch 108 opens when either of the inputs to the AND gate 116 are LOW. When the switch 108 closes, the capacitor $C_D$ discharges according to the difference in the currents $I_T$ and $I_D$. For example, when the switch 108 is closed, the current $I_T$–$I_D$ is pulled out of the capacitor $C_D$ to cause the voltage across the capacitor $C_D$ to decrease accordingly. During this same interval, the RAMP signal provided by the waveform generator 110 increases proportional to the current $I_{IN}$ applied to the capacitor $C_T$. Once the RAMP signal (e.g., voltage across $C_T$) and the voltage across $C_D$ are equal, the limited PWM signal at 114 goes LOW, which causes the AND gate 116 to provide a low output at 118. This causes the switch 108 to open, such that the capacitor $C_D$ charges as a function of the reference current $I_T$. Where $C_T$ and $C_D$ are matched capacitors (e.g., proportional), they charge proportionally until the RAMP signal is reset based on the CLOCK pulse. That is, improved accuracy in operation can be achieved by matching the internal capacitors and current mirrors, which matching can employ substantially any ratio between components. A special case exists where $I_T=I_{IN}$ and $C_T=C_D$, as the capacitors will charge at the same rate while the switch 108 is open. Thus, the component matching between the waveform generator 110 and the clamp system 100 enables a desired high level of accuracy to be achieved for the duty cycle clamping function.

The system 100 also includes a peak voltage clamp 120 coupled to the non-inverting input of the comparator 102 through a diode 122. The clamp 120 is programmed and/or configured to prevent overcharging of the capacitor $C_D$ according to a predetermined peak voltage of the RAMP signal. For example, if the voltage across $C_D$ exceeds a peak voltage by a threshold level, indicated at epsilon ($\epsilon$), the diode 122 is forward biased to shunt the voltage away from the capacitor $C_D$. The value of epsilon can be fixed or programmable. Typically, the clamp 120 clamps the voltage across the capacitor $C_D$ to a value that is greater than the peak of the ramp waveform provided by the waveform generator 110. Those skilled in the art will understand and appreciate that various other approaches can be utilized to implement a suitable peak voltage clamp for the voltage across $C_D$.

With respect to the example of FIG. 2, the AND-gate 116, the switch 108 and the comparator 102 define a loop, which is closed (e.g. to enable duty cycle regulation) based on the comparator output 114 relative to the PWM duration. For example, the loop is not closed (or regulating) unless the PWM duration is greater than a maximum duty cycle ($D_{max}$). So, if the switch 108 is opened by a valid short duration PWM signal, then the node 103 will cease discharging and charge $C_D$ for the remainder of the period.

For purposes of simplification and understanding in this example, assume $C_D=C_T$ and $I_T=I_{IN}$, although these relationships are not necessary. When the next period begins, $C_D$ would be charged to a higher voltage than $C_T$. For very short PWM widths, its value will be clamped by the clamp 120 and diode 122. In a situation where the PWM width is greater than the $D_{max}$ width and where this relationship has been existed for several previous cycles, $C_D$ will discharge based on $I_D$ through the closed switch 108. When $C_D$ reaches the $C_T$ voltage, $C_D$ resumes charging, such that both capacitors would charge to the substantially the same voltage at the end of the period. Thus, those skilled in the art will appreciate that the know relationship between $C_D$ and $C_T$ and their respective starting voltages enables $D_{max}$ to be calculated.

By way of further example, the dv/dt characteristics for both capacitors $C_D$ and $C_T$ are known. Additionally, $C_D$ and $C_T$ will start the cycle with known relative voltages since $C_T$ is discharged abruptly by the clock signal associated with the waveform generator 110.

If the PWM width has been less than $D_{max}$ for a sufficient number of cycles, it is likely that $C_D$ may not start the next cycle with the substantially the same voltage as $C_T$ (e.g., at the top of the $C_T$ ramp voltage), but rather by an incremental voltage ($\epsilon$) above the peak of the $C_T$ ramp voltage. Consequently, in this situation, the first cycle in which the PWM width changes from a width that is less than $D_{max}$ to a width greater than $D_{max}$, the effective clamped duty cycle ($D_{clamp}$) for that cycle will be incrementally greater than the steady state clamp value, which can be expressed as follows:

$$D_{clamp} = D_{max} * \left(1 + \frac{\epsilon}{V_{pp}}\right), \qquad \text{Eq. 1}$$

where $V_{pp}$ represents the peak to valley difference of the ramp voltage and $D_{max}$ is the desired steady state clamped duty cycle. That is, the peak voltage clamp 120 and diode 122 operate to modify the clamp waveform at 114 by a predetermined amount, such that the comparator 102 provides the limiting waveform having a transient duty cycle $D_{clamp}$ to limit the PWM signal accordingly. $D_{clamp}$ is incrementally greater than the maximum duty cycle (e.g., as provided in Eq. 1) which facilitates a rapid duty cycle limit convergence time. For example, the condition where the duty ratio is limited as in Eq. 1 will exist for only a first limited cycle. In the first limited cycle, when the decreasing voltage of $C_D$ intersects the increasing voltage of $C_T$, the voltage of $C_D$ will track the rising voltage of $C_T$ from then on, and the limit of the duty ratio is given by Eq. 1. If the clamped condition remains, the limit of the duty ratio is $D_{max}$.

For power converter applications, the slightly lengthened duration during the first cycle should not result in core saturation because the transformer is designed to not saturate with the temporarily extended duty ratio limit. In fact, most transformer designs will encounter a hysteresis loss limit before they encounter a core saturation limit. Thus, the approach just described permits a brief (e.g., single cycle) excursion to allow an increased duty ratio in a transient event, but maintain a smaller steady state limit if the operating point is sustained for a longer duration (e.g., more than one cycle). An alternative approach might be to control the switch 108 as a function of the voltage at 103 instead of based on the signal at 118.

FIG. 3 is an example of a waveform generator 150 that can be implemented in accordance with an aspect of the present invention. The waveform generator 150 includes a capacitor $C_T$ that is coupled to an input of an oscillator 152. A current source 154 provides a reference current $I_T$ to the capacitor $C_T$. The reference current $I_T$ can be generated as a function of an external component, such as a resistor.

For example, as shown in FIG. 4, a reference current $I_T$ can be derived by coupling a resistor $R_T$ to a programming pin 156 having a corresponding reference voltage. The programming pin 156 for example provides a reference voltage for an associated integrated circuit in which the waveform generator 150 is implemented. Those skilled in the art will understand and appreciate that the reference voltage can be a reference voltage that is proportional to any known fixed reference voltage in the IC (e.g., $V_{REF}/2$).

Referring back to FIG. 3, the current $I_T$ is operative to charge the capacitor $C_T$ to generate a ramp waveform indicated at 158. A switch, such as a transistor 160, also is coupled to the input of the oscillator in parallel with the capacitor $C_T$. The transistor 160 is controlled as a function of a CLOCK signal that the oscillator 152 provides to a control input of the transistor 160. The oscillator 152 provides a CLOCK signal, such as based on the RAMP signal reaching a desired peak voltage magnitude. As a result, the RAMP output signal can be provided at 158 having a desired frequency and peak amplitude level. Those skilled in the art will understand and appreciate other oscillator topologies that can be utilized to generate a desired reference waveform in accordance with an aspect of the present invention.

FIG. 5 illustrates an approach that can be utilized to provide the reference current $I_D$ for the clamp system of FIG. 2 can be generated in accordance with an aspect of the present invention. In this example, a resistor $R_D$ is coupled to a programming pin 170 of an associated IC. For example, the IC includes the waveform generator and the clamp system in accordance with an aspect of the present invention. The resistor $R_D$ is coupled between a reference voltage $V_{REF}$ (or a voltage proportional to the reference voltage) and a programming pin, which provides a predetermined voltage, so as to generate the reference current $I_D$. For example, the programming pin 170 corresponds to a fixed reference voltage (e.g., $V_{REF}/2$) that is less than the voltage $V_{REF}$ to which the resistor $R_D$ is coupled. Associated circuitry, schematically indicated at supply 172 provides the fixed reference voltage $V_{REF}/2$.

Referring back to FIG. 2, those skilled in the art will appreciate that the system 100 seeks to maintain a zero charge change on a cycle-by-cycle basis for the capacitor $C_D$. Consequently, the duty cycle D can be expressed as:

$$D = \frac{I_D}{I_T} = \frac{R_D}{R_T}. \qquad \text{Eq. 2}$$

That is, the duty cycle can be programmed based on the ratio of the two external resistors $R_T$ and $R_D$ in accordance with an aspect of the present invention.

FIG. 6 is a graph of various signals in a clamp system implemented according to an aspect of the present invention. For example, with reference to the clamp system of FIG. 2, the graph depicts the relationship between the voltages across the capacitors $C_D$ and $C_T$, indicated respectively at 200 and 202, and a resulting comparator output signal (e.g., limiting signal), indicated at 204. Thus, for purposes of context, FIG. 6 will be described in connection with the operation of the clamp system 100 shown and described in FIG. 2. FIG. 6 also depicts the duration of a period, indicated at 206, for the PWM signal 204, and the corresponding duty cycle (or "on time") at 208.

Referring between FIGS. 2 and 6, the voltage 200 across $C_D$ initially decreases as a function of the current source 106 being coupled to the capacitor $C_D$ through the switch 108, thereby drawing the current $I_D$ from $C_D$. That is, the voltage 200 ($V_{C_D}$) across $C_D$ changes according to:

$$\frac{dV_{C_D}}{dt} = \frac{I_T - I_D}{C_D}, \text{ where } I_D > I_T. \qquad \text{Eq. 3}$$

Contemporaneously, during the duty cycle 208, the clamp waveform 202 across $C_T$ increases as a function of the reference current $I_T$, which can be expressed as:

$$\frac{dV_{C_T}}{dt} = \frac{I_T}{C_T}. \qquad \text{Eq. 4}$$

After the voltages intersect, the comparator output signal 204 (at 114 in FIG. 2) goes LOW. Those skilled in the art will appreciate that depending on the implementation, additional circuitry can be utilized to stabilize and drive the input at 114 of the AND gate 118, as depicted in FIG. 2. For example, a latch can be inserted between the comparator 102 and the AND gate 118. In this way, the comparator 102 would set the latch (not shown), which would be reset by the clock signal at the beginning of the next period. Alternatively, a comparator 102 having desired hysteresis could be utilized to provide similar operation.

Regardless of the implementation details, when the voltages 200 and 202 intersect, the switch 108 is caused to open, such that the current source 106 is no longer activated to draw the current $I_D$ from the capacitor $C_D$. Consequently, during the latter portion (e.g., "off-time") of the limiting signal during the period 206, where the output signal 204 from the comparator 102 is LOW, the capacitor $C_D$ charges as a function of the reference current $I_T$. Those skilled in the art will understand and appreciate that if $C_D$ is equal to $C_T$ and the currents provided to the respective capacitors are the same, the voltages across $C_D$ and $C_T$ will have an identical slope during the portion of the period 206 when the switch 108 is opened (e.g., during the "off-time"), as depicted in FIG. 6. Thus, from Eq. 4, it can be shown that:

$$\frac{dV}{dt} = \frac{I_T}{C_T} = \frac{I_T}{C_D}.$$  Eq. 5

Those skilled in the art will appreciate that substantially proportional (e.g., equivalent) slopes for curves 200 and 202 (indicative of change in voltage for $C_D$ and $C_T$) can be achieved during the "off-time" of the period 208, even in circumstances where $C_D$ and $C_T$ have different proportional capacitances. For example, such characteristics between voltages 200 and 202 can exist by controlling the currents through $C_D$ and $C_T$. For example, if $C_D=\frac{1}{2}C_T$, the same slopes can be achieved by sourcing twice the current to $C_T$. Alternatively, $C_D$ and $C_T$ can be matched to other proportional values and proportional reference currents can be generated by appropriately configuring current mirrors in the integrated circuit. Such matching and mirroring of proportional currents is facilitated by implementation within an IC chip.

The period 206 ends in response to the waveform generator 110 resetting the waveform 202, such as based on the CLOCK signal having a predetermined frequency. The comparator 102 output signal goes HIGH, corresponding to another "on-time" for next period of the signal 204 in FIG. 6, which causes the switch 108 to close. The current source 106, in turn, draws current $I_D$ to discharge the capacitor $C_D$ accordingly. The periodic cycle can continue to provide the limited PWM output signal (at 118 in FIG. 2) based on the comparator output signal 204 and the PWM signal, as described above.

Thus, those skilled in the art will understand and appreciate that the system 100 provides an effective maximum duty cycle ($D_{max}$) by limiting the PWM signal with a duty cycle 208 that is functionally related to the resistor components $R_D$ and $R_T$ (e.g. $D_{max}$ is proportional to $R_D/R_T$). In this way, the comparator output signal 204 operates to limit the duty cycle of PWM signal.

By way of further example, FIG. 7 depicts an alternative arrangement for generating the current $I_D$, which can be variable. In this approach, a reference current is set by coupling an external resistor $R_D$ to a control voltage, such as a power input line voltage $V_{IN}$, such as a line input voltage. Specifically, in FIG. 7, the external resistor $R_D$ is coupled between the line voltage $V_{IN}$ and a program pin 220 of an IC, which IC can include a clamp system implemented in accordance with an aspect of the present invention. The program pin 220 is coupled to circuitry, schematically indicated at 222, which is operative to provide a substantially fixed voltage $V_{REF}/2$ that is less than $V_{IN}$, where $V_{REF}$ defines a fixed reference voltage of the IC. It is to be appreciated that any reference voltage different from $V_{REF}/2$ alternatively could be utilized at 222.

The reference current $I_D$ thus is provided as a function of the voltage $V_{REF}/2$ at the pin 220, $V_{IN}$ and $R_D$ $$\left(\text{e.g., } I_D = \frac{V_{IN} - \frac{V_{REF}}{2}}{R_D}\right).$$

Because $V_{REF}$ and $R_D$ are substantially fixed, variations in $I_D$ are attributable to fluctuations in $V_{IN}$. Where the programming pin voltage is much less than $V_{IN}$, then the reference current $I_D$ approximates $V_{IN}/R_D$, which is a reasonable approximation for $V_{IN} \gg V_{REF}/2$. Alternatively, Page: 14 if the assumption that Vin $\gg$Vref/2 is not valid, then additional resistance in series with $R_D$ could be utilized. For example, a second resistor coupled in between the pin 220 and the circuitry 222 and having substantially the same value as $R_D$ would make $$I_D = \frac{V_{IN}}{R_D},$$

irrespective of the relative sizes of $V_{IN}$ and $V_{REF}$. Thus, such additional resistance can be utilized for small $V_{IN}$ to enhance the accuracy of the volt-second clamp.

From Eq. 2 and in view of the above approximation, it follows that the duty cycle D for a clamp system can be expressed as follows:

$$D = \frac{I_T}{I_D} = \frac{I_T * R_D}{V_{IN}}$$  Eq. 6

OR $$D*V_{IN}=I_T*R_D=\text{Constant}.$$  Eq. 7

Thus, Eqs. 6 and 7 demonstrate that the clamp system also operates a volt-second (or volt-duty) clamp in accordance with an aspect of the present invention. Those skilled in the art will understand and appreciate that the clamp system provides an accurate clamping function in response to perturbations of the circuit, such as a change in $V_{IN}$ or a forced synchronization of RAMP signal. Advantageously, such clamping can occur rapidly, such as within about one PWM period (or clock cycle) from such a perturbation. In response to a change in $V_{IN}$, for example, such clamping is achieved by modifying the duty cycle D to maintain the constant relationship as indicated in Eq. 7.

Figure 8:
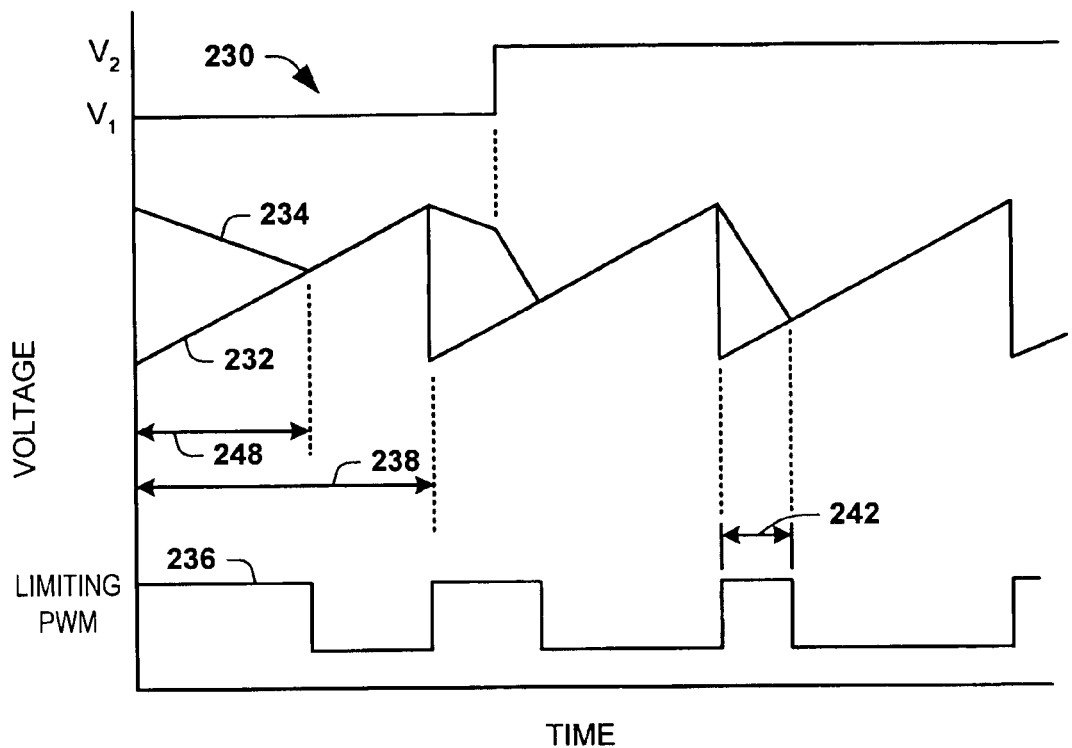
FIG. 8 illustrates a graph of several signals versus time in a clamp system operating in accordance with another aspect of the present invention.

By way of example, FIG. 8 is a graph (similar to FIG. 6) illustrating operation of a clamp system implemented as volt-second clamp in accordance with an aspect of the present invention. To facilitate understanding of such operation, FIG. 8 will be described with reference to FIGS. 2, 7 and 8. An input voltage 230 is employed in connection with an external resistor to generate a reference current (e.g., $I_D$ in FIG. 7) for the clamp system. The graph of FIG. 8 also depicts a reference waveform voltage 232 (e.g., across the capacitor $C_T$ in FIG. 2) that is provided as an input to the comparator 102 as function of another reference current $I_T$. The clamp system also generates a clamp waveform 234, which is compared relative to the reference waveform 232 for providing a limiting signal 236 that can be applied to limit a PWM signal in accordance with an aspect of the present invention. The limiting PWM signal 236 (e.g., provided by the comparator 102 in FIG. 2) has a period 238 (e.g., based on a clock cycle or other synchronization) and a duty cycle 248, which is functionally related to the voltage of signal 230 and the relationship between the waveforms 232 and 234. As mentioned herein, the voltage waveforms 232 and 234 across the respective capacitors are functionally related to reference currents that vary according to one or more external resistors. The resistors thus can be set by the user to provide a desired maximum duty cycle.

In the example of FIG. 8, the duty cycle remains substantially constant until the signal 230 changes, namely, by increasing from a first voltage $V_1$ to a second different voltage $V_2$. While for purposes of brevity, in the example of FIG. 8, $V_1<V_2$, those skilled in the art will understand and appreciate that other relationships could exist between $V_1$ and $V_2$ (e.g, $V_2$ could be less than $V_1$). In response to the signal 230 changing from $V_1$ to $V_2$, the signal 234 decreases more quickly (e.g. an increased negative slope). This is due to a corresponding increase in the reference current $I_D$, which can be proportional to the change in the input voltage 230. As mentioned above, the reference current $I_D$ operates to discharge the capacitor $C_D$ during the duty cycle (or "on-time") 248 of the clamp system 100. The PWM limiting signal 236 (at 114 in FIG. 2) goes LOW after the decreasing voltage 234 across $C_D$ reaches the increasing voltage 232 across $C_T$. The signal 236 thus remains LOW until the RAMP signal 232 is reset for the next period.

During the next period, the duty cycle 242 has decreased from the duty cycle 248 associated with the lower input voltage 230. In particular, the duty cycle 242 has decreased an amount that is inversely proportional to the increase in the input voltage 230, which is employed to generate the reference current $I_D$. Those skilled in the art will appreciate that the clamp system thus provides an accurate volt-duty clamp, which actually is a volt-second clamp, in which the input voltage $V_{IN}$ times the duty cycle D remains substantially constant (see, e.g., Eq. 7) in accordance with an aspect of the present invention. For example, as shown in FIG. 8, the clamp system operates as an accurate volt-second clamp operative to clamp the PWM signal within the next clock cycle from the perturbation of $V_{IN}$.

Figure 9:
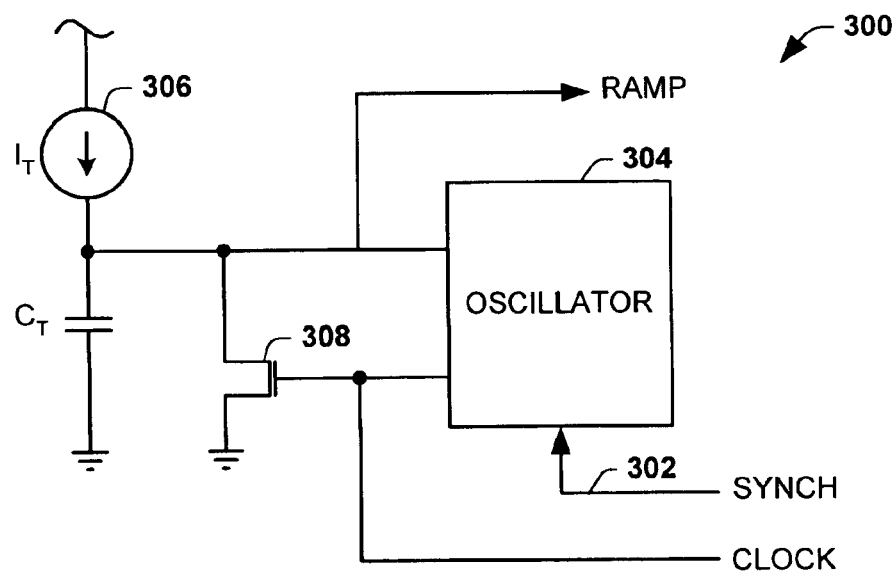
FIG. 9 depicts an example of another waveform generator that can be utilized in conjunction with a clamp system in accordance with an aspect of the present invention.

FIG. 9 depicts another example of a waveform generator 300 that can be employed to provide a RAMP signal to a clamp system in accordance with an aspect of the present invention. The waveform generator 300 is substantially similar to the waveform generator of FIG. 3, but also includes a synchronization input for receiving a SYNCH signal. Briefly stated, the waveform generator 300 includes an oscillator 304 coupled to a capacitor $C_T$ that is coupled to receive a current $I_T$ from a current source 306. The current source 306, for examples, generates the current $I_T$ by mirroring a desired reference current functionally related to an external component, such as a resistor. A switching device 308 is coupled to shunt the capacitor $C_T$ based on a CLOCK signal generated by the oscillator 304 as a function of the RAMP signal. The oscillator 304, in turn, can provide the CLOCK signal at the rate defined by the SYNCH signal or directly pass the SYNCH signal as the CLOCK signal to associated circuitry.

The SYNCH input signal can be provided by synchronization circuitry, which can be generated internally or externally relative to the IC containing the clamp system. The SYNCH signal enables a user to define a frequency of the RAMP signal that may be different from that generated by the oscillator 304 as a function of the RAMP signal relative to a predetermined peak voltage. For example, the SYNCH signal can be employed to provide a faster RAMP signal by causing the oscillator to terminate the RAMP waveform prematurely according to the faster clock signal provided as the SYNCH signal. A faster clock typically will result in a lower peak voltage of the RAMP signal since $C_T$ will discharge more frequently.

Those skilled in the art will understand and appreciate that a clamp system implemented according to an aspect of the present invention will automatically adjust to a faster clock frequency and maintain a correct clamp value, such as programmed by one or more external resistors (e.g., $R_D$ and/or $R_T$). It further will be appreciated that additional accuracies beyond conventional systems can be achieved by having CT be external to the oscillator circuit and matched with the capacitor of the clamp system according to an aspect of the present invention.

Figure 10:
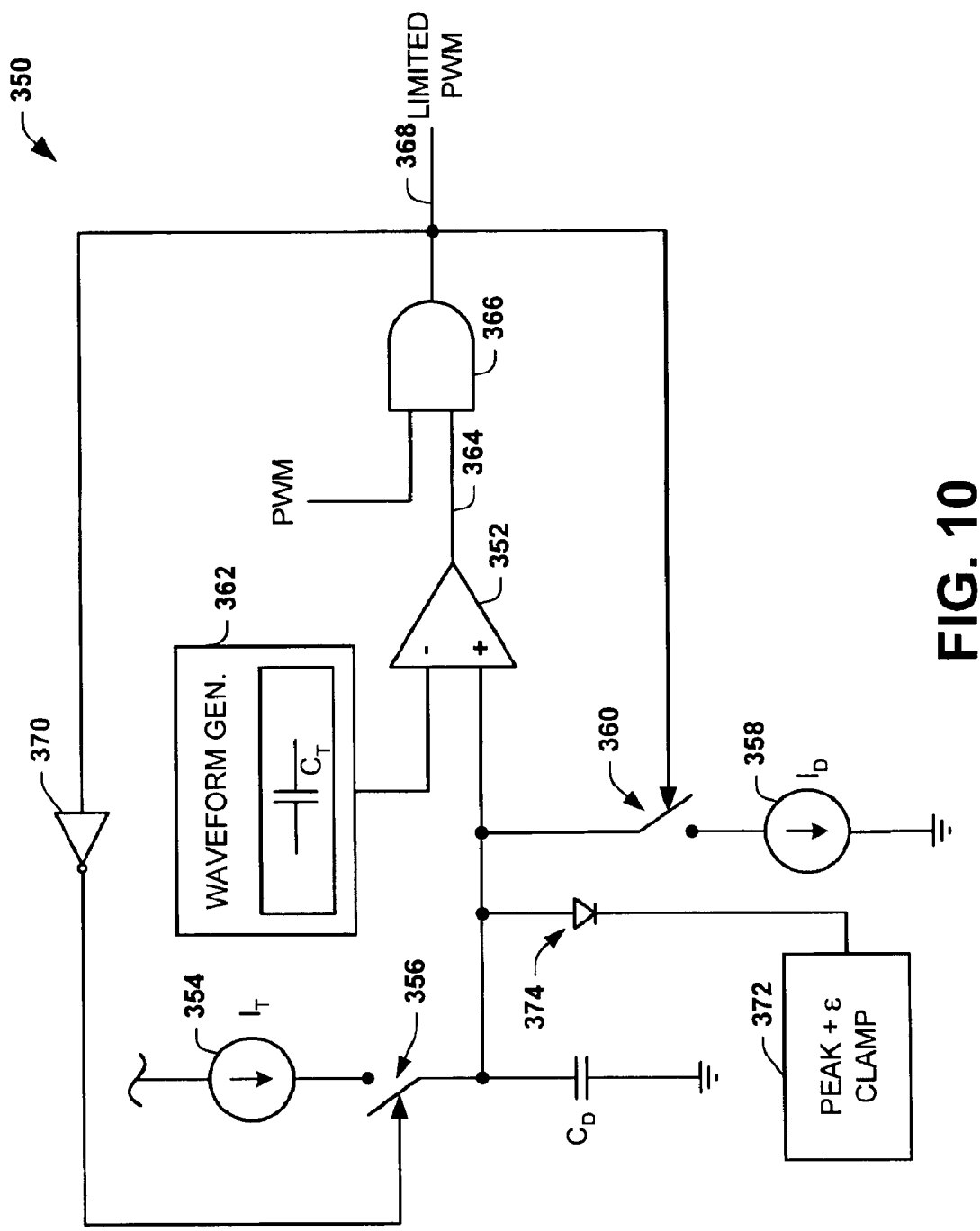
FIG. 10 depicts an example of another clamp system in accordance with an aspect of the present invention.

FIG. 10 depicts another example of a clamp system 350 that can be implemented in accordance with an aspect of the present invention. The system 350 is similar to that shown and described with respect to FIG. 2. Briefly stated, the clamp system 350 includes a capacitor $C_D$ that is coupled to a non-inverting input of a comparator 352. A current source 354 is coupled to provide a reference current $I_T$ to the $C_D$ through a switch device 356. Another current source 358 is coupled to sink current $I_D$ relative to the non-inverting input of the comparator 352 through an associated switch 360. In the example of FIG. 10, the switches 356 and 360 operate out of phase with each other to source and sink respective currents $I_T$ and $I_D$ relative to $C_D$ according to their switch states. The currents $I_D$ and $I_T$ are provided as a function of reference currents defined by user-programmable external reference components, such as resistors. A waveform generator 362 provides a RAMP signal to an inverting input of the comparator 352. The RAMP signal can be generated as a function of one more components, including a capacitor $C_T$. Matching of the capacitors $C_T$ and $C_D$ can be facilitated by implementing the clamp system and the waveform generator (or at least the respective capacitors thereof) in the same IC chip according to an aspect of the present invention. By matching the capacitors, an improved accuracy in the operation of the clamp system can be achieved relative to many conventional systems.

The comparator 352 provides a limiting output signal at 364 as a function of the relative levels of the RAMP waveform (e.g., the voltage across $C_T$) and clamp waveform (e.g., the voltage across $C_D$). The limiting signal at 364 and a PWM signal are provided to inputs of an AND gate 366. It is to be appreciated that the comparator 352 could be a hysteretic comparator or a latch could be employed at the comparator output to facilitate providing a stable limiting signal to the AND gate 366. The AND gate 366 generates a limited PWM output signal at 368, which is limited according to which of the input signals has a lower duty cycle. That is, the limited PWM signal at 368 corresponds to a clamped PWM signal, which can be clamped to a maximum duty cycle or to a maximum volt-second value according to the circuit topology, as described herein. The PWM signal, for example, can be generated by an associated PWM controller (not shown), such as may control the "on-time" of a power converter or other power electronic device utilizing the clamp system 350.

The limited signal at 368 also is fed back to control the state of the switches 356 and 360, and thereby control the charging and discharging of the capacitor $C_D$. In particular, the signal at 368 is inverted, such as by an inverter 370, such that the switches 356 and 360 operate out of phase. Those skilled in the art will understand and appreciate various other approaches that can be employed to operate the switches out of phase with each other. By operating the switches 356 and 360 in this mutually exclusive manner, the clamp system 350 can more effectively operate for short duty cycles (e.g., less than about 35%) since the $C_D$ can discharge more quickly when the source 354 is not coupled to provide $I_T$ to $C_D$.

The system 350 can also include a peak clamp 372 and diode 374 coupled in parallel with the capacitor $C_D$ to mitigate overcharging of the capacitor $C_D$ according to a predetermined peak voltage. For example, if the voltage across $C_D$ exceeds a peak voltage of the RAMP waveform by a predetermined threshold level, indicated at epsilon ($\epsilon$), the diode 374 is forward biased to shunt the voltage away from the capacitor $C_D$. Those skilled in the art will understand and appreciate that various other approaches can be utilized to implement a suitable peak voltage clamp.

Figure 11:
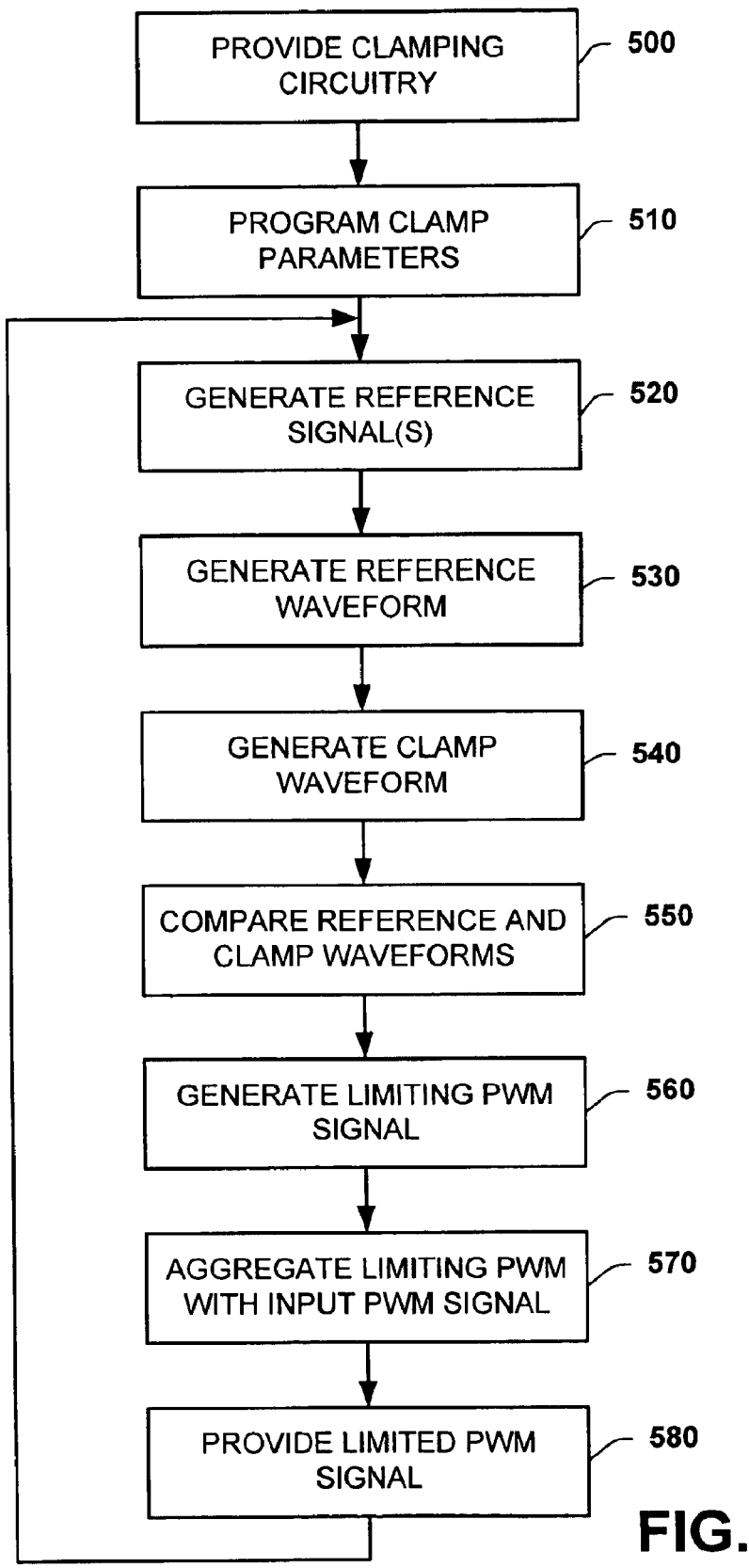
FIG. 11 is a flow diagram illustrating a methodology for limiting a maximum duty cycle or providing volt-second clamping in accordance with an aspect of the present invention.

In view of the foregoing structural and functional features described above, a methodology for generating a ramp (e.g., up or down) signal, in accordance with an aspect of the present invention, will be better appreciated with reference to FIG. 11. While, for purposes of simplicity of explanation, the methodology of FIG. 11 is shown and described as being implemented serially, it is to be understood and appreciated that the present invention is not limited to the illustrated order, as some aspects could, in accordance with the present invention, occur in different orders and/or concurrently with other aspects from that shown and described. Moreover, not all illustrated features may be required to implement a methodology in accordance with an aspect of the present invention. It is to be further understood that the following methodologies can be implemented in hardware, such as one or more integrated circuits (e.g., analog and/or digital), software, or any combination thereof.

Turning to FIG. 11, the methodology begins at the methodology begins at 500 in which clamping circuitry is provided. The clamping circuitry can operate as a maximum duty-cycle clamp and/or as a volt-second clamp according to an aspect of the present invention. The duty-cycle and a constant defined by the duty cycle and an input voltage are programmable electrical characteristics for implementing desired clamping in accordance with an aspect of the present invention.

At 510, one or more clamp parameters are programmed. The programming of clamped parameters, for example, is implemented by coupling external components to the clamping circuitry provided at 500 to establish reference electrical characteristics for the clamping methodology. The external components, for example, can be resistors or any other components or combination of components capable of setting a desired electrical characteristic (e.g., maximum duty cycle) for limiting a maximum duty cycle of a PWM signal according to an aspect of the present invention. Those skilled in the art will appreciate that various types of components or circuitry that can be utilized to program corresponding electrical characteristics. After the clamping parameters have been programmed at 510, the methodology can proceed to 520, which can be considered normal operation of the methodology.

At 520, one or more reference signals are generated according to the programmed parameters. The reference signals can be reference currents, which can be fixed or variable. For example, a first current is fixed and a second current can be either fixed or variable depending on the circuit topology implemented to provide the reference currents. The reference currents can be mirrored (e.g., through appropriate current mirrors) throughout the clamp system and other associated circuitry based on the reference signals provided by the programming at 510. As described herein, the reference signals define clamping characteristics, such as a maximum duty-cycle or a constant associated with a volt-second clamp.

At 530, a reference waveform is generated, such as a function of a first reference signal (e.g., a reference current). The reference waveform, for example, is a ramp waveform (e.g., a saw waveform) that is provided as a function of a first reference current and oscillates at a predetermined frequency. The frequency can be set internally or otherwise synchronized to an externally generated clock signal.

At 540, a clamp waveform is generated as a function of the first reference current and a second reference current. For example, the first reference current can be utilized to generate the waveform with slope commensurate with the slope of the reference waveform during a first part of a PWM period, and the second reference current can be applied to cause the wave form to have an opposing slope relative to the reference current during the remainder of the PWM period. Consequently, application of the second reference current causes the convergence of the reference and clamp waveforms. By way of further example, the first reference current is sourced to charge a capacitor and the second reference current can be applied to sink current away from the capacitor. The second reference current can be supplied alone or in combination with the sourcing of the first reference current. As used herein, commensurate slope and opposing slope are intended to identify the relative signs (positive or negative) of the respective waveforms.

The second reference current can be applied according to a PWM output signal (see, e.g., 580 below) provided by the clamp system. At 540, the reference waveform is compared relative to the clamp waveform, such as by a comparator. The comparison results in a limiting signal at 560, which has a duty cycle that depends on the relative levels of the waveforms generated at 530 and 540. That is, the limiting waveform generated at 560 defines a maximum duty cycle for the system based on the operating parameters programmed at 510.

At 570, the limiting signal is applied to a PWM signal, such as provided by a PWM controller or other PWM modulator. This can be implemented by ANDing the limiting signal with the PWM signal. For example, the PWM signal can be a signal intended to control a power level in an associated power converter system or other of power electronic device. Thus, the methodology provides an effective mechanism to limit a maximum duty cycle of the PWM signal. At 580, a PWM output signal is provided according to the limiting signal applied at 570. In this way, the PWM output signal will have a maximum duty cycle according to the duty cycle of the limiting signal. From 580, the methodology can return to 520 to continue implementing the clamping function during normal operation.

Those skilled in the art will understand and appreciate that methodology is flexible and adaptable to accommodate perturbations in the associated circuitry, such as change in one of the reference signals (e.g., the second reference signal) generated at 520. For example, if the second reference current were to increase or decrease, the clamp waveform generated at 540 would also change accordingly (e.g., proportionally) and thereby adjust the duty-cycle of the limiting signal provided at 560. As a result, the PWM output signal provided at 580 can be modified based on the duty-cycle changes in the limiting signal, such that the clamping functions as volt-second clamp according to an aspect of the present invention.

What has been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system to limit a maximum duty cycle of a pulse-width modulated (PWM) signal, comprising:

circuitry that provides a clamp waveform based at least in part on a first reference signal;

a comparator that compares the clamp waveform relative to a reference waveform to provide a limiting signal, the reference waveform is based at least in part on a second reference signal, such that the limiting signal has a duty cycle functionally related to the first and second reference signals, whereby application of the limiting signal to the PWM signal limits the PWM signal to within a maximum duty cycle.

2. The system of claim 1, further comprising a first reference component that defines the first reference signal and a second reference component that defines the second reference signal, at least one of the first and second reference components being programmable to set the duty cycle of the limiting signal.

3. The system of claim 2, the first and second reference components comprising respective first and second resistors.

4. The system of claim 1, at least one of the first and second reference signals being variable so that the duty cycle of the limiting varies as a function of the variable one of the first and second reference signals, whereby the system operates as a volt-second clamp.

5. The system of claim 1, the circuitry further comprising a capacitor coupled to generate the clamp waveform based on selective application of at least one of the first and second reference signals relative to the capacitor.

6. The system of claim 5, the circuitry further comprising at least one switch coupled to selectively provide at least the second reference signal relative to the capacitor based on the limiting signal and the PWM signal.

7. The system of claim 6, further comprising clamp circuitry coupled to the capacitor and operative, based on the state of the at least one switch, to modify the clamp waveform to limit the PWM signal to a transient duty cycle that is incrementally greater than the maximum duty cycle, whereby a rapid duty cycle limit convergence time is facilitated.

8. An integrated circuit comprising the system of claim 1, the integrated circuit further comprising a waveform generator that generates the reference waveform.

9. The integrated circuit of claim 8,
the waveform generator generates the reference waveform to have a waveform characteristic as a function of least a first component thereof,
the circuitry generates the clamp waveform to have a waveform characteristic as a function of at least a second component, the first and second components being substantially matched components in the integrated circuit.

10. The integrated circuit of claim 9, the first and second components further comprising respective first and second capacitors.

11. The integrated circuit of claim 10, further comprising at least one switch coupled to selectively provide at least the second reference signal relative to second capacitor based on the limiting signal and the PWM signal.

12. The integrated circuit of claim 9, the waveform generator generating the reference waveform to have a frequency based on one of a predetermined peak threshold level and a synchronization signal.

13. The integrated circuit of claim 8, further comprising a first resistor that defines the first reference signal and a second resistor that defines the second reference signal, at least one of the first and second resistors being external to the integrated circuit and programmable to set the duty cycle of the limiting signal.

14. A system to limit a maximum duty cycle of a pulse-width modulated (PWM) control signal, comprising:
a waveform generator that provides a reference waveform based on a first reference signal; and
a clamp system that generates a clamp waveform based on the first reference signal and a second reference signal, the clamp system providing a limiting signal based on the reference waveform relative to the clamp waveform, such that the limiting signal can be applied to limit the duty cycle of the PWM signal.

15. The system of claim 14,
the waveform generator further comprising a first component that provides the reference waveform based on application of the first reference signal relative to the first component; and
the clamp system further comprising a second component that provides the clamp waveform based on application of the first and second reference signals relative to the second component.

16. The system of claim 15, the first and second components further comprising substantially matched capacitors.

17. The system of claim 15, further comprising at least one switch coupled to selectively provide at least the second reference signal relative to the capacitor of the clamp system based on the limiting signal and the PWM signal.

18. The system of claim 14, further comprising a first resistor that defines the first reference signal and a second resistor that defines the second reference signal, at least one of the first and second resistors being programmable to set the duty cycle of the limiting signal.

19. The system of claim 14, the limiting signal having an on-time and an off-time during each period thereof, the reference waveform and the clamp waveform having substantially proportional slopes during the off-time of periods for the limiting signal.

20. An integrated circuit comprising the system of claim 14.

21. A system to limit a maximum duty cycle of a pulse-width modulated (PWM) control signal, comprising:
means for generating a reference waveform based on a first reference signal;
means for generating a clamp waveform based on at least a second reference signal;
means for providing a limiting signal based on a comparison of the reference waveform and the clamp waveform; and
means for applying the limiting signal to limit the duty cycle of the PWM signal according to the duty cycle of the limiting signal, which is functionally related to the first and second reference signals.

22. The system of claim 21, further comprising means for programming at least one of the first and second reference signals.

23. The system of claim 21, the reference waveform generating means and the clamp waveform generating means including matched capacitors that operate to provide the respective reference and clamp waveforms.

24. A method for limiting a maximum duty cycle of a pulse-width modulated (PWM) signal, comprising:
receiving a reference waveform based on a first reference signal;
generating a clamp waveform based on a second reference signal and the first reference signal; and
comparing the reference waveform relative to the clamp waveform to provide a limiting signal having a duty cycle functionally related to the first and second reference signals, whereby application of the limiting signal to the PWM signal limits the duty cycle of the PWM signal.

25. The method of claim 24, further comprising programming the second reference signal based on a resistive component.

26. The method of claim 25, further comprising:
programming the first reference signal by coupling a first external resistive component to an integrated circuit operative to implement the method; and
programming the second reference signal by coupling a second external resistive component to the integrated circuit, such that the maximum duty cycle is set as a function of the first and second resistive components.

27. The method of claim 26, the reference waveform being generated based on application of the first reference signal to a first capacitor, the clamp waveform being generated based on application of the first and second reference signals to a second capacitor, the first and second capacitors being substantially matched capacitors in the integrated circuit.

* * * * *